(12) United States Patent
Wilson et al.

(10) Patent No.: US 11,886,909 B2
(45) Date of Patent: Jan. 30, 2024

(54) METHOD AND SYSTEM FOR DETERMINING APPLICATION MIGRATION ELIGIBILITY IN EXECUTION ENVIRONMENTS

(71) Applicant: Dell Products L.P., Round Rock, TX (US)

(72) Inventors: Lucas Avery Wilson, Cedar Park, TX (US); Dharmesh M. Patel, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 418 days.

(21) Appl. No.: 17/384,223

(22) Filed: Jul. 23, 2021

(65) Prior Publication Data
US 2023/0026541 A1 Jan. 26, 2023

(51) Int. Cl.
*G06F 9/48* (2006.01)
(52) U.S. Cl.
CPC ...... *G06F 9/4856* (2013.01); *G06F 2209/482* (2013.01)

(58) Field of Classification Search
None
See application file for complete search history.

(56) References Cited

U.S. PATENT DOCUMENTS

| | | | | |
|---|---|---|---|---|
| 2009/0144393 A1* | 6/2009 | Kudo | ............ | G06F 9/5044 707/999.2 |
| 2018/0139686 A1* | 5/2018 | Kalhan | ............ | H04M 1/6066 |

* cited by examiner

*Primary Examiner* — Craig C Dorais
(74) *Attorney, Agent, or Firm* — Chamberlain, Hrdlicka, White, Williams & Aughtry; Aly Z. Dossa

(57) ABSTRACT

Techniques described herein relate to a method for managing migrations of applications. The method may include identifying, by a verification manager associated with an execution environment, an application potential migration event associated with an application; in response to identifying the application potential migration event: obtaining application configuration information associated with the application; making a determination that the application configuration information indicates the execution environment is capable of hosting the application; generating potential migration information associated with the execution environment and the application; and sending an affirmation and the potential migration information to the application.

17 Claims, 8 Drawing Sheets

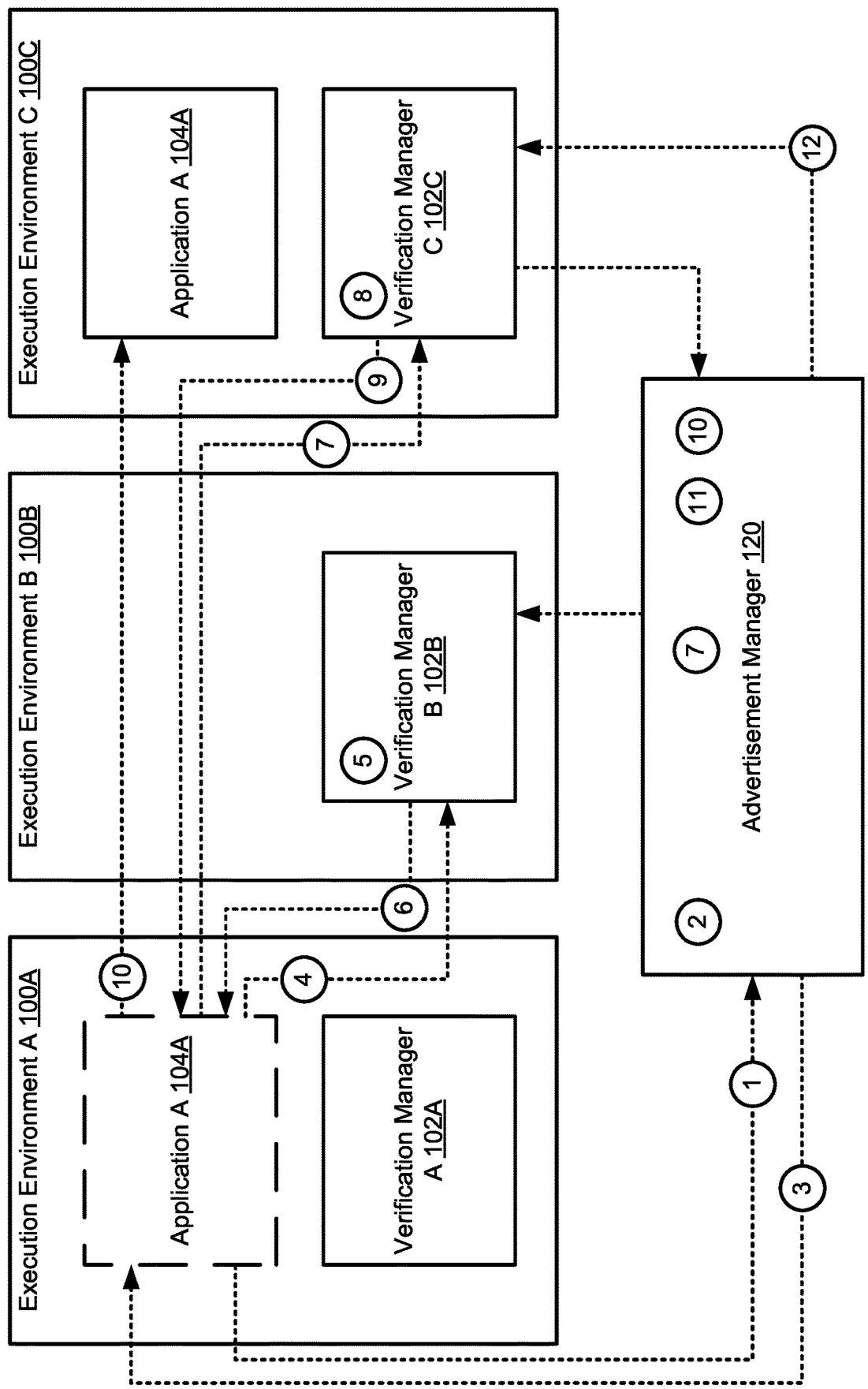

METHOD AND SYSTEM FOR DETERMINING APPLICATION MIGRATION ELIGIBILITY IN EXECUTION ENVIRONMENTS

BACKGROUND

Computing devices may provide services. To provide the services, the computing devices may include hardware components and software components. The computing devices may host one or more applications. The applications may be important to users. The applications may be migrated from one computing device to another computing device.

SUMMARY

In one aspect, a method for managing migrations of applications in accordance with one or more embodiments of the invention includes receiving, by a verification manager associated with an execution environment, an application potential migration event associated with an application, wherein the application is executing on a second execution environment; in response to identifying the application potential migration event: obtaining, by the verification manager, application configuration information associated with the application; making a determination, by the verification manager, that the application configuration information indicates that the execution environment is capable of hosting the application; in response to the determination: generating, by the verification manager, potential migration information associated with the execution environment and the application; and sending, by the verification manager, an affirmation and the potential migration information to the application.

In one aspect, a non-transitory computer readable medium in accordance with one or more embodiments of the invention includes computer readable program code, which when executed by a computer processor enables the computer processor to perform a method for managing migrations of applications in accordance with one or more embodiments of the invention. The method includes receiving, by a verification manager associated with an execution environment, an application potential migration event associated with an application, wherein the application is executing on a second execution environment; in response to identifying the application potential migration event: obtaining, by the verification manager, application configuration information associated with the application; making a determination, by the verification manager, that the application configuration information indicates that the execution environment is capable of hosting the application; in response to the determination: generating, by the verification manager, potential migration information associated with the execution environment and the application; and sending, by the verification manager, an affirmation and the potential migration information to the application.

In one aspect, a system for managing migrations of applications in accordance with one or more embodiments of the invention includes an execution environment and a verification manager of the execution environment. The verification manager is configured to receive an application potential migration event associated with an application, wherein the application is executing on a second execution environment; in response to identifying the application potential migration event: obtain, by the verification manager, application configuration information associated with the application; make a determination, by the verification manager, that the application configuration information indicates the execution environment is capable of hosting the application; in response to the determination: generate, by the verification manager, potential migration information associated with the execution environment and the application; and send, by the verification manager, an affirmation and the potential migration information to the application.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3B show diagrams of the operation of an example system over time in accordance with one or more embodiments of the invention.

DETAILED DESCRIPTION

Figure 1A:
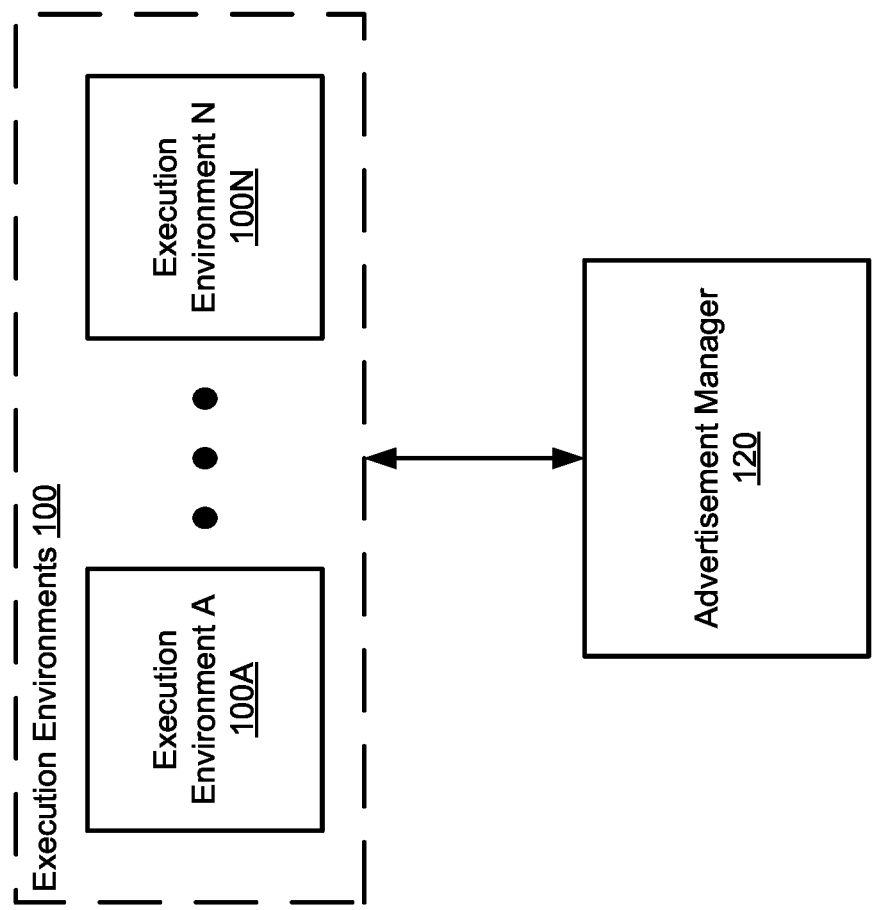
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for managing the migration of applications between execution environments. Execution environments may register, through verification managers associated with the execution environments, with an advertisement manager that maintains an execution environment inventory of execution environment that are available for application migration to automatically expand application migration options. Additionally, each execution environment may be associated with a different type of execution environment. Further, the advertisement manager may provide the execution environment inventory to applications that desire to migrate. The applications may use the execution environment information to send application migration eligibility requests to verification managers. The verification managers may determine whether associated execution environments are capable of hosting the applications and generate potential migration information that may be used by the applications to determine whether to migrate to the associated execution environments. As a result, applications may efficiently determine whether an execution environment is appropriate for migration with no prior knowledge of the execution environment.

FIG. 1A shows a diagram of a system in accordance with one or more embodiments of the invention. The system may include execution environments (100) and an advertisement manager (120). The system may include additional, fewer, and/or different components without departing from the invention. Each component of the system may be operably connected to any other components via any combination of wired and/or wireless connections. Each of the components of the system illustrated in FIG. 1A is discussed below.

In one or more embodiments of the invention, the execution environments (100) perform computer implemented services for users (e.g., clients, not shown). The computer implemented services may include, for example, classification, inferencing, training machine learning models, executing machine learning models, natural language processing, image processing, and/or any other computer implemented service without departing from the invention. To perform the computer implemented services, the execution environments may host one or more applications (discussed below). The execution environments (100) may perform other and/or additional services without departing from the invention.

In one or more embodiments of the invention, the execution environments (100) include one or more execution environments. The execution environments (100) may include, for example, execution environment A (100A) and execution environment N (100N). The execution environments (100) may include any number of execution environments (e.g., 100A, 100N) without departing from the invention.

In one or more embodiments of the invention, each execution environment (e.g., 100A) is implemented using any number of computing devices (not shown). In one or more embodiments, a computing device is any device, portion of a device, or any set of devices capable of electronically processing instructions and may include any number of components, which include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create an execution environment (e.g., 100A). Other types of computing devices may be used without departing from the invention.

In one or more embodiments, such computing devices may be operatively connected to other computing devices of an execution environment (e.g., 100A) in any way, thereby creating any topology of computing devices within the execution environment (e.g., 100A). In one or more embodiments, one or more computing devices in an execution environment (e.g., 100A) may be operatively connected to any one or more devices in any other execution environment (e.g., 100N).

In one or more embodiments of the invention, each execution environment (e.g., 100A) of the execution environments (100) may be similar and/or different execution environment types compared to other execution environments (e.g., 100N). An execution environment type may refer to the type and/or amount of computing devices and computing resources, geographic location, and/or other and/or additional information associated with an execution environment without departing from the invention. For example, a first execution environment type (e.g., an edge environment) may include sensors collecting data, controllers controlling the sensors, desktop devices, mobile computing devices, etc. Other execution environment types may include different computing devices. For example, a second execution environment type (e.g., a private data center) may have a device set that include servers with more compute ability than devices in the first execution environment type. Similarly, a third execution environment type (e.g., a public cloud environment) may include more powerful (e.g., having more compute resources) devices, a greater quantity of more powerful devices, specific architectures of sets of devices for performing certain tasks, etc. The execution environment types may include other and/or additional execution environment types without departing from the invention. For additional information regarding execution environments, refer to FIG. 1B.

In one or more embodiments of the invention, the advertisement manager (120) includes the functionality to perform execution environment advertisement services. The execution environment advertisement services may include:

(i) registering execution environments, (ii) maintaining an execution environment inventory (discussed below), and (iii) providing all and/or a portion of the execution environment inventory to applications hosted by the execution environments (100) and/or entities that manager the applications (not shown) to determine to which execution environments to potentially migrate. The execution environment advertisement services may include other and/or additional services without departing from the invention. The advertisement manager (120) may include the functionality to perform the method depicted in FIG. 2A. The advertisement manager (120) may include other and/or additional functionalities without departing from the invention. For additional information regarding the advertisement manager (120), refer to FIG. 1C.

The advertisement manager (120) may be implemented using a computing device. The computing device may be, for example, an embodiment of the computing devices discussed above. For additional details regarding computing devices, refer to FIG. 4.

The advertisement manager (120) may be implemented using a logical device without departing from the invention. For example, the advertisement manager (120) may be a logical entity that utilizes computing resources of any number of physical computing devices to provide the functionality of the advertisement manager (120). The advertisement manager (120) may be implemented using any type of logical device without departing from the invention.

Figure 1B:
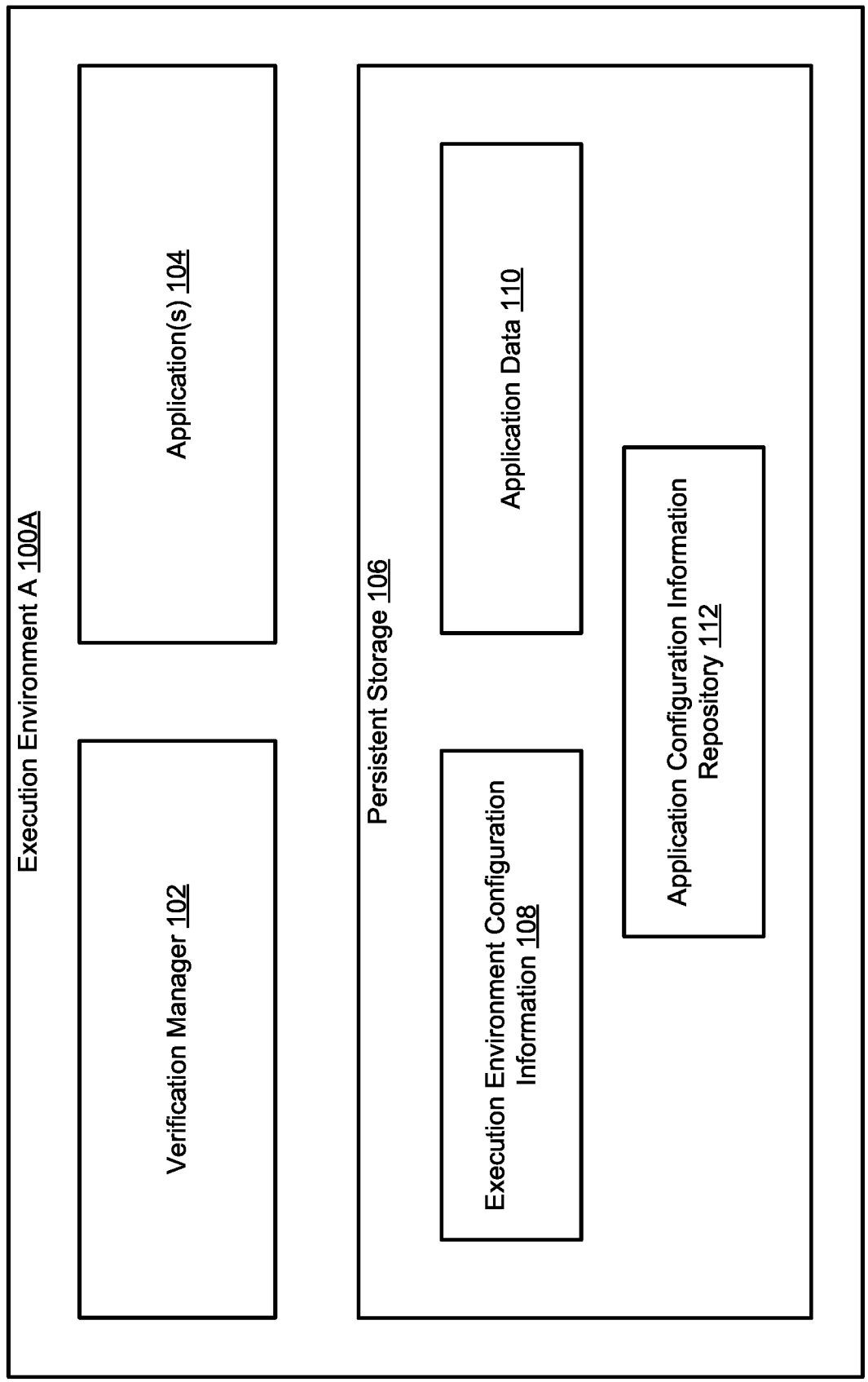
FIG. 1B shows a diagram of an execution environment in accordance with one or more embodiments of the invention.

FIG. 1B shows a diagram of an execution environment in accordance with one or more embodiments of the invention. In one or more embodiments of the invention, execution environment A (100A) may be an embodiment of an execution environment of the execution environments (100, FIG. 1A) discussed above. As discussed above, the execution environments provide computer implemented services to users (e.g., clients, not shown). To provide the aforementioned services, execution environment A (100A) may include a verification manager (102), an application(s) (104) and persistent storage (106). Execution environment A (100A) may include other and/or additional components without departing from the invention. Each of the aforementioned components of execution environment A (100A) is discussed below.

In one or more embodiments of the invention, the verification manager (102) includes the functionality register execution environment A (100A) with the advertisement manager (120, FIG. 1A). To register execution environment A (100A) with the advertisement manager (120, FIG. 1A), the verification manager (102) may send registration requests and provide information associated with execution environment A (100A) to the advertisement manager (120, FIG. 1A). For additional information regarding registering execution environments, refer to FIG. 2A. The verification manager (102) may include other and/or additional functionalities without departing from the invention.

In one or more embodiments of the invention, the verification manager (102) includes the functionality to determine application migration eligibility (i.e., whether and application (e.g., 104) is capable of migrating to and/or executing in execution environment A (100A)). To determine application migration eligibility, the verification manager (102) may obtain requests and application configuration information (112) (discussed below) from applications executing on other execution environments and provide a confirmation, a rejection, and/or application migration information (discussed below) to the aforementioned applications. The verification manager (102) may compare the obtained application configuration information with execution environment configuration information (108) (discussed below). Additionally, the verification manager (102) may generate the application migration information. For additional information regarding determining application migration eligibility, refer to FIG. 2B. The verification manager (102) may include other and/or additional functionalities without departing from the invention.

The verification manager (102) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the verification manager (102) described throughout this application and/or all or a portion of the methods illustrated in FIGS. 2A-2B. The verification manager (102) may be some other physical device without departing from the invention.

Figure 2A:
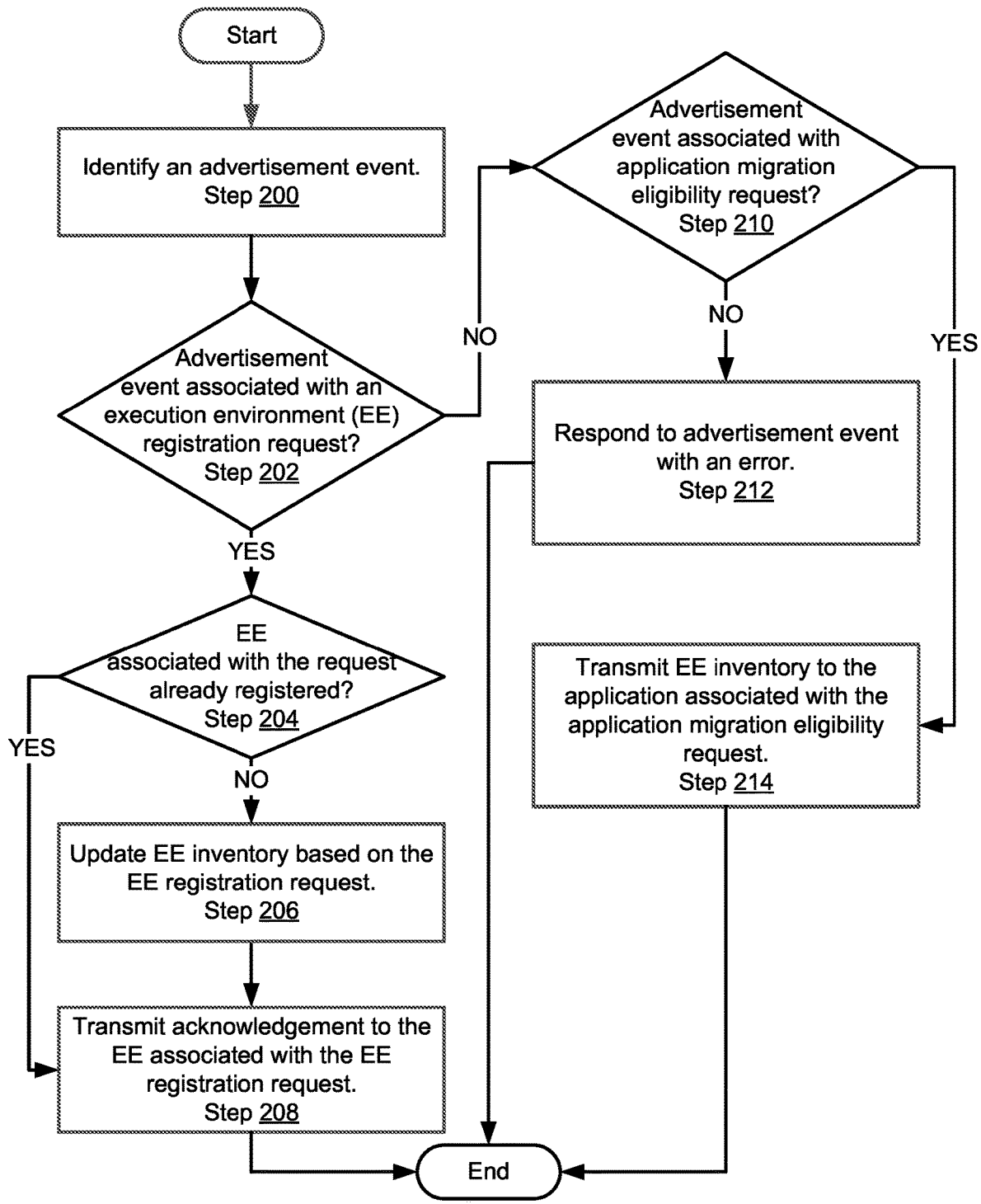
FIG. 2A shows a flowchart of a method for performing execution environment advertisement services in accordance with one or more embodiments of the invention.
Figure 2B:
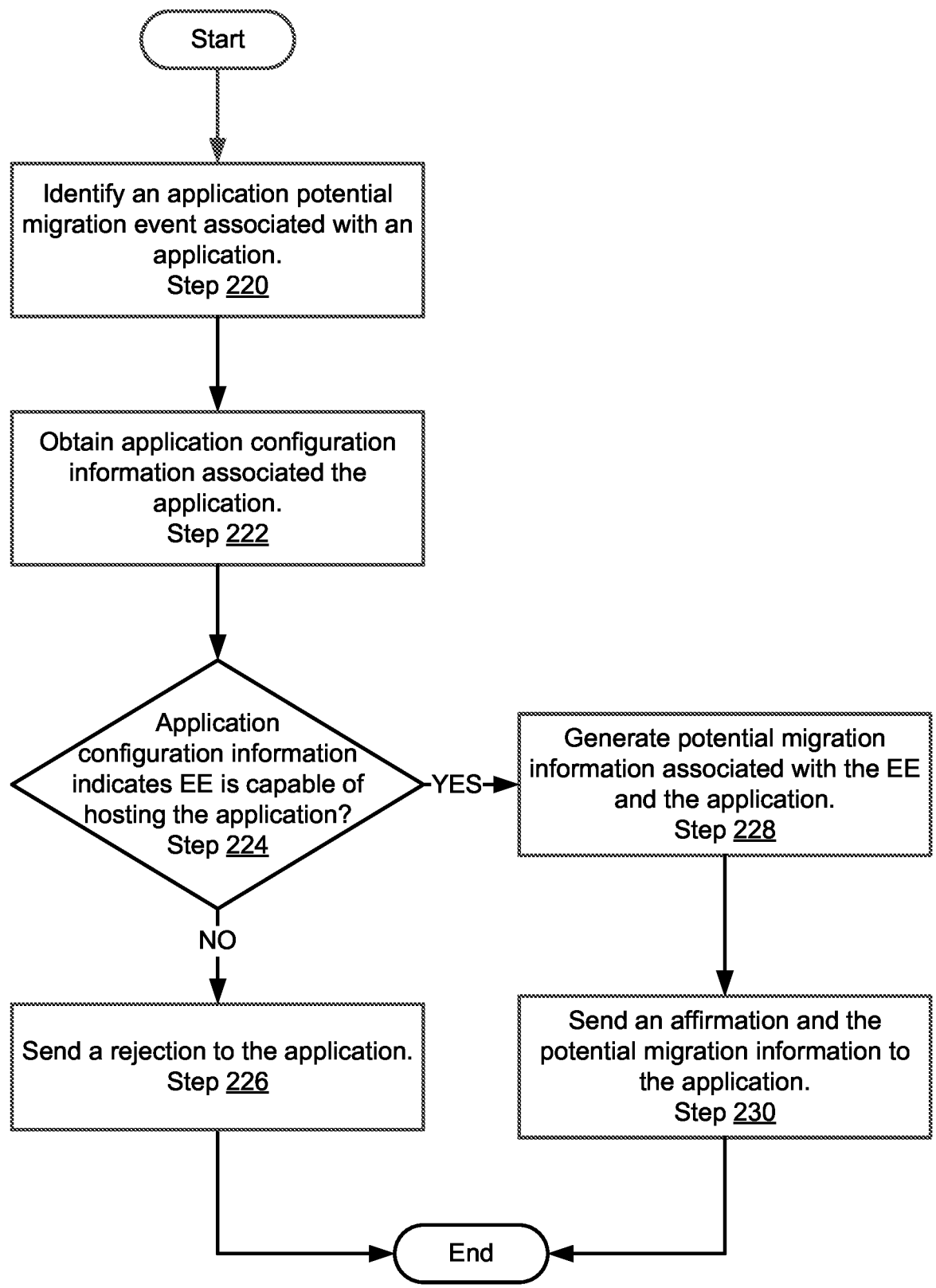
FIG. 2B shows a flowchart of a method for determining application migration eligibility in accordance with one or more embodiments of the invention.

The verification manager (102) may be implemented using computer instructions (e.g., computing code) stored on a persistent storage (e.g., 114) that when executed by a processor of execution environment A (100A) causes execution environment A (100A) to perform the functionality of the verification manager (102) described throughout this application and/or all or a portion of the methods illustrated in FIGS. 2A-2B.

As discussed above, execution environment A (100A) may host an application(s) (104). Execution environment A (100A) may host any number of applications without departing from the invention. The application(s) (104) may be a logical entity executed using computing resources (not shown) of execution environment A (100A). The application(s) (104) may perform a process. In one or more embodiments of the invention, the application(s) (104) provides a computer implemented service to users, e.g., clients (not shown). The application(s) may be, for example, an instance of natural language processor, a machine learning model trainer, and/or other applications without departing from the invention.

The application(s) (104), or an entity managing the application(s) (104), may include the functionality to request information from the advertisement manager (120, FIG. 1A) regarding other execution environments in which the application(s) may migrate. The application(s) (104) may send requests and application configuration information associated with the application(s) (104) to verification managers (e.g., 102) of other execution environments. The application may include other and/or additional functionalities without departing from the invention.

In one or more embodiments of the invention, the application(s) (104) is implemented using computer instructions, e.g., computer code, stored on a persistent storage (e.g., 106) that when executed by a processor(s) of execution environment A (100A) cause execution environment A (100A) to provide the functionality of the application(s) (104) described throughout this application.

In one or more embodiments of the invention, the persistent storage (106) stores data. The persistent storage (106) may be implemented using one or more physical storage devices and/or a logical storage device.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

The persistent storage (106) may include execution environment configuration information (108), application data (110), and an application configuration information repository (112). The persistent storage (106) may store other and/or additional data without departing from the invention. Each of the aforementioned data structures stored in the persistent storage (106) is discussed below.

In one or more embodiments of the invention, the execution environment configuration information (108) is one or more data structures that includes configuration information associated with execution environment A (100A). The execution environment configuration information (108) may include execution environment resource information and execution environment procedure information. The execution environment configuration information (108) may be generated by the verification manager (102), a user of execution environment A (100A), and/or one or more manufacturers of execution environment A (100A) and/or the resources of execution environment A (100A). The execution environment configuration information (108) may be used by the verification manager (102) to determine application migration eligibility. The execution environment configuration information (108) may include other and/or additional information associated with execution environment A (100A) without departing from the invention.

In one or more embodiments of the invention, the execution environment resource information includes information that may specify the resources available to execution environment A. The execution environment resource information may include a list of resources (e.g., hardware and/or software components) of execution environment A (100A), resource types (e.g., central processing units, graphics processing units, network cards, routers, hard disk drives, operating systems, etc.), resource versions, performance characteristics associated with each component (e.g., memory size, storage size, network speeds, IOPS, cache size, clock speed, etc.), and/or utilization information associated with the resources that specifies a portion of all/or a portion of the resources of execution environment A (100A) that may be available. The execution environment resource information may include other and/or additional information associated with the resources of execution environment A (100A) without departing from the invention.

In one or more embodiments of the invention, the execution environment procedure information includes information that may specify procedural information associated with execution environment A (100A). The procedural information may include security and compliance information (e.g., encryption algorithms such as AES, RSA, and/or triple DES, data backup procedures (e.g., replication, erasure coding, etc.), compliance standards (e.g., general data protection regulation (GDPR)), etc.), a user identifier (e.g., a unique bit string associated with a user of execution environment A (100A)), and/or a geographic location of execution environment A (100A). The procedural information may include other and/or additional information associated with execution environment A (100A) without departing from the invention.

In one or more embodiments of the invention, the application data (110) is one or more data structures that includes data generated and/or used by the application(s) (104) and/or users of the application(s) (104) during the performance of computer implemented services. The application data (110) may be any type of data such image data, text data, and video data generated by users of the execution environment A (100A). The application data (110) may include other and/or additional types of data without departing from the invention.

In one or more embodiments of the invention, the application configuration information repository (112) is one or more data structures that includes entries that include application configuration information of the application(s) (104) and/or applications of other execution environments. Each application of the application(s) (104) may be associated with an application configuration information entry. Each entry may include application configuration information associated the application corresponding to the entry. Additionally, the application configuration information repository (112) may include one or more entries associated with applications of other execution environments that request for the verification manager (102) to determine whether the applications are capable of migrating to execution environment A (100A). The application configuration information may be generated by the associated applications, manufacturers of the associated applications, and/or users of the associated applications. The application configuration information may be used by the verification manager (102) to determine application migration eligibility. The application configuration information may be sent by the application(s) (104) to other execution environments to determine application migration eligibility with the other execution environments.

In one or more embodiments of the invention, the application configuration information includes resource requirements and/or procedural requirements associated with the application corresponding to the application configuration information. The resource requirements may specify the components, the component types, the component versions, and/or the performance characteristics required to host the application associated with the application information (all discussed above). The resource requirements may include other and/or additional information that specify resource requirements to host the application without departing from the invention. The procedural requirements may specify security and compliance information, one or more user identifiers associated users with the application, and a geographic location required to host the associated application. In one or more embodiments of the invention, the application configuration information may include other and/or additional information that specifies requirements for hosting the corresponding application without departing from the invention.

While the data structures (e.g., 108, 110, 112) of the persistent storage (106) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (106), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 1C:
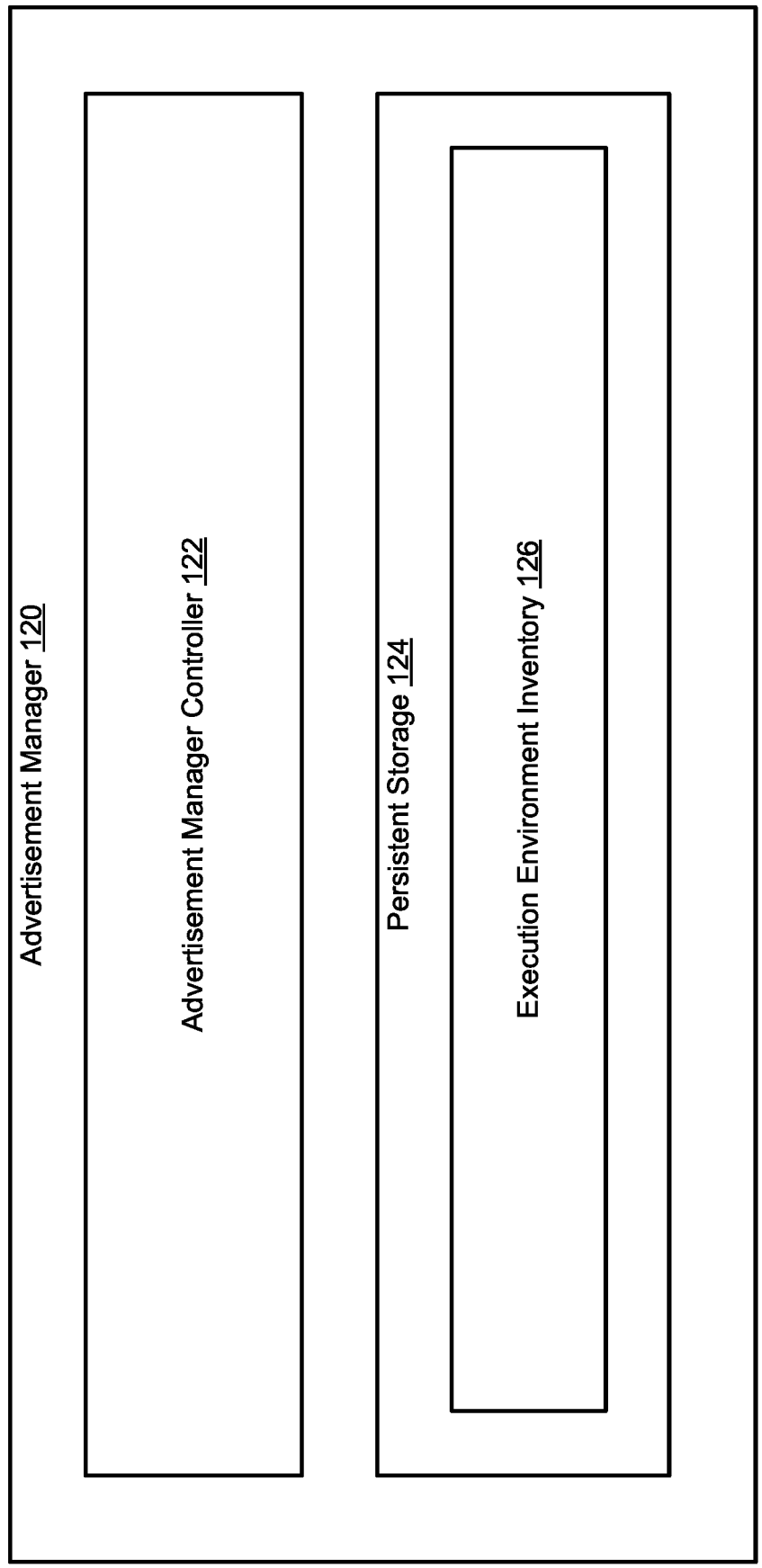
FIG. 1C shows a diagram of an advertisement manager in accordance with one or more embodiments of the invention.

FIG. 1C shows a diagram of an advertisement manager in accordance with one or more embodiments of the invention. In one or more embodiments of the invention, the advertisement manager (120) may be an embodiment of the advertisement manager (120, FIG. 1A) discussed above. As discussed above, the advertisement manager may provide execution environment advertisement services. To provide the aforementioned services, the advertisement manager (120) may include an advertisement manager controller (122) and persistent storage (124). The advertisement manager (120) may include other and/or additional components without departing from the invention. Each of the aforementioned components of the advertisement manager (120) is discussed below.

In one or more embodiments of the invention, the advertisement manager controller (122) includes the functionality to perform the execution environment advertisement services of the advertisement manager (120). The advertisement manager controller (122) may (i) obtain registration requests from verification managers of execution environments, (ii) request and obtain communication information (discussed below) associated with the execution environments, maintain an execution environment inventory, (iii) receive requests from applications for execution environment inventory information, and (iv) provide all and/or a portion of the execution environment inventory to the applications. The advertisement manager controller (122) may include other and/or additional functionalities without departing from the invention.

The advertisement manager controller (122) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the advertisement manager controller (122) described throughout this application and/or all or a portion of the methods illustrated in FIGS. 2A-2B. The advertisement manager controller (122) may be some other physical device without departing from the invention.

The advertisement manager controller (122) may be implemented using computer instructions (e.g., computing code) stored on a persistent storage (e.g., 114) that when executed by a processor of the advertisement manager (120) causes the advertisement manager (120) to perform the functionality of the advertisement manager controller (122) described throughout this application and/or all or a portion of the methods illustrated in FIGS. 2A-2B.

In one or more embodiments of the invention, the persistent storage (124) stores data. The persistent storage (124) may be an embodiment of the persistent storage (106) discussed above. For additional information regarding the persistent storage (124), refer to FIG. 1B.

The persistent storage (124) may include an execution environment inventory (126). The persistent storage (124) may store other and/or additional data without departing from the invention.

In one or more embodiments of the invention, the execution environment inventory (126) is one or more data structures that specifies registered execution environments which may be available for application migration. The execution environment inventory (126) may include a list of execution environment identifiers (e.g., a unique combination of bits) associated with execution environment that have registered with the advertisement manager (120). The execution environment inventory (126) may further include communication information associated with each registered execution environment. Each execution environment identifier may be associated with communication information corresponding to the same execution environment. The communication information may include, for example, a network address, a port number, security information (e.g., encryption keys, etc.), and/or any other information associated with an execution environment that may be used to establish and/or perform communications without departing from the invention. The execution environment inventory (124) may include other and/or additional information associated with registered execution environment without departing from the invention. The execution environment inventory (126) may be generated and/or maintained by the advertisement manager controller (122). The execution environment inventory may be provided to applications to use to contact execution environments to perform application migration eligibility determinations.

While illustrated as being stored in the persistent storage (124), the execution inventory (126) may be stored in different locations (e.g., in persistent storage of other computing devices, in memory rather than persistent storage, in a combination of memory and persistent storage, etc.) and/or spanned across any number of computing devices without departing from the invention. The execution environment inventory (126) may be implemented using, for example, lists, tables, linked lists, databases, and/or other types of data structures.

FIG. 2A shows a flowchart of a method for performing execution environment advertisement services in accordance with one or more embodiments of the invention. The method may be performed by, for example, an advertisement manager (120, FIG. 1A). Other components of the system in FIG. 1A may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, an advertisement event is identified.

In one or more embodiments of the invention, the advertisement event includes obtaining a registration request from a verification manager of an execution environment or obtaining an application migration eligibility request from an application.

In one or more embodiments of the invention, the advertisement manager obtains a message from a verification manager of an execution environment. The message may include a request to register the execution environment with the advertisement manager. The message may also include an execution environment identifier associated with the execution environment from which the registration request originated. The message may further include communication information associated with the execution environment from which the registration request originated. The message may include other and/or additional information associated with the execution environment without departing from the invention. The advertisement manager may identify obtaining the registration request as the advertisement event. The advertisement event may be identified via other and/or additional methods without departing from the invention.

In one or more embodiments of the invention, the advertisement manager obtains a message from an application of an execution environment. The message may include a request to determine application migration eligibility. The request may include an application identifier associated with the application and/or an execution environment identifier associated with the execution environment in which the application that sent the application migration eligibility request. The message may include other and/or additional information without departing from the invention. The advertisement manager may identify obtaining the application migration eligibility request as the advertisement event. The advertisement event may be identified via other and/or additional methods without departing from the invention.

In step 202, a determination is made as to whether the advertisement event is associated with an execution environment registration request.

In one or more embodiments of the invention, the advertisement determines whether the advertisement event is associated with an execution environment registration request by checking the contents of the message of the advertisement event. As discussed above, the advertisement event may include obtaining a message that includes a request to register an execution environment or a message that includes an application migration eligibility request. The advertisement manager may also check what entity sent the message. As discussed above, a verification manager may send the execution environment request and an application may send the application migration eligibility request.

If the advertisement manager identifies an execution environment request included in the message of the advertisement event or identifies that the advertisement event originated from a verification manager, then the advertisement manager may determine that the advertisement event is associated with an execution environment registration request. If the advertisement manager identifies an application migration eligibility request is included in the message of the advertisement event or identifies that the advertisement event originated from an application, then the advertisement manager may determine that the advertisement event is not associated with an execution environment registration request. The determination as to whether the advertisement event is associated with an execution environment registration request may be made via other and/or additional methods without departing from the invention.

In one or more embodiments of the invention, if it is determined that the advertisement event is associated with an execution environment registration request, then the method may proceed to step 204. In one or more embodiments of the invention, if it is determined that the advertisement event is not associated with an execution environment registration request, then the method may proceed to step 210.

In step 204, a determination is made as to whether the execution environment associated with the registration request is already registered.

In one or more embodiments of the invention, the advertisement manager uses the execution environment identifier included in the execution environment registration request and the execution environment inventory to determine whether the execution environment associated with the registration request is already registered. As discussed above, the execution environment inventory includes a list of execution environment identifiers associated with registered execution environments. The advertisement manager may compare the execution environment identifier included in the registration request with the list of execution environment identifiers included in the execution environment inventory. If the execution environment identifier included in the registration request matches an execution environment identifier included in the execution environment inventory, then the advertisement manager may determine that the execution environment associated with the registration request is already registered. If the execution environment identifier included in the registration request does not match an execution environment identifier included in the execution environment inventory, then the advertisement manager may determine that the execution environment associated with the registration request is not already registered. The determination as to whether the execution environment associated with the registration request is already registered may be made via other and/or additional methods without departing from the invention.

In one or more embodiments of the invention, if it is determined that the execution environment associated with the registration request is already registered, then the method may proceed to step 208. In one or more embodiments of the invention, if it is determined that the execution environment associated with the registration request is not already registered, then the method may proceed to step 206.

In step 206, the execution environment inventory is updated based on the execution environment registration request.

In one or more embodiments of the invention, the advertisement manager uses the execution environment identifier and the communication information to update the execution environment inventory. The advertisement manager may update the list of execution environment identifiers to include the execution environment identifier included in the registration request. The advertisement manager may also update the execution environment inventory to include the communication information included in the registration request. The advertisement manager may also update the execution environment inventory to associate the execution environment identifier and the communication information included in the registration request. The execution environment inventory may be updated based on the execution environment registration request via other and/or additional methods without departing from the invention.

In step 208, an acknowledgement is transmitted to the execution environment associated with the registration request.

In one or more embodiments of the invention, the advertisement manager sends a message to the verification manager that send the registration request. The message may include a notification that indicates that the execution environment associated with the verification manager is registered with the advertisement manager. The message may include other and/or additional information without departing from the invention. an acknowledgement may be transmitted to the execution environment associated with the registration request via other and/or additional methods without departing from the invention.

In one or more embodiments of the invention, the method may end following step 208.

In step 210, a determination is made as to whether the advertisement event is associated with an application migration eligibility request.

In one or more embodiments of the invention, the advertisement determines whether the advertisement event is associated with an application migration eligibility request by checking the contents of the message of the advertisement event. As discussed above, the advertisement event may include obtaining a message that includes a request to register an execution environment or a message that includes an application migration eligibility request. The advertisement manager may also check what entity sent the message. As discussed above, a verification manager may send the execution environment request and an application may send the application migration eligibility request.

If the advertisement manager identifies an application migration eligibility request is included in the message of the advertisement event or identifies that the advertisement event originated from an application, then the advertisement manager may determine that the advertisement event is associated with an application migration eligibility request. If the advertisement manager identifies an application migration eligibility request is not included in the message of the advertisement event or identifies that the advertisement event did not originate from an application, then the advertisement manager may determine that the advertisement event is not associated with an application migration eligibility request. The determination as to whether the advertisement event is associated with an application migration eligibility request may be made via other and/or additional methods without departing from the invention.

In one or more embodiments of the invention, if it is determined that the advertisement event is associated with an application migration eligibility request, then the method may proceed to step 214. In one or more embodiments of the invention, if it is determined that the advertisement event is not associated with an application migration eligibility request, then the method may proceed to step 212.

In step 212, the advertisement event is responded to with an error.

The advertisement manager may obtain requests for services which the advertisement manager is not capable of performing (i.e., not execution environment registration requests or application migration eligibility requests). The advertisement manager may send a message to the entity that sent the request. The message may include an error notification. The message may include other and/or additional information without departing from the invention. The advertisement event may be responded to with an error via other and/or additional methods without departing from the invention.

In one or more embodiments of the invention, the method may end following step 212.

In step 214, the execution environment inventory is transmitted to the application associated with the application migration eligibility request.

In one or more embodiments of the invention, the advertisement manager generates a copy of at least a portion of the execution environment inventory. The at least a portion of the execution environment inventory may not include the execution environment identifier and communication information associated with the execution environment that hosts the application associated with the application migration eligibility request. The advertisement manager may send a message to the application associated with the application migration eligibility request. The message may include the copy of the at least a portion of the execution environment inventory. The message may include other and/or additional methods without departing from the invention. The execution environment inventory may be transmitted to the application associated with the application migration eligibility request via other and/or additional methods without departing from the invention.

In one or more embodiments of the invention, the method may end following step 214.

FIG. 2B shows a flowchart of a method for determining application migration eligibility in accordance with one or more embodiments of the invention. The method may be performed by, for example, a verification manager (102, FIG. 1B) of an execution environment (e.g., 100A, FIG. 1A). Other components of the system in FIGS. 1A-1B may perform all, or a portion, of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, an application potential migration event associated with an application is received.

In one or more embodiments of the invention, the verification manager obtains a message from an application hosted by an execution environment that is not the execution environment associated with the verification manager. The verification manager may identify obtaining the message as the application potential migration event. The message may include a request to determine application migration eligibility between the application and the execution environment associated with the verification manager. The message may further include communication information associated with the application. The message may include other and/or additional information without departing from the invention. The application potential migration event associated with the application may be received via other and/or additional methods without departing from the invention.

In step 222, application configuration information associated with the application is obtained.

In one or more embodiments of the invention, the verification manager sends a message to the application. The verification manager may use the communication information obtained in step 220 to send the message. The message may include a request for application configuration information associated with the application. In response to the request for application configuration information, the application may generate and/or obtain the application configuration information associated with the application and provide the application configuration information to the verification manager. The application configuration information associated with the application may be obtained via other and/or additional methods without departing from the invention.

In step 224, a determination is made as to whether the application configuration information indicates that the execution environment is capable of hosting the application.

In one or more embodiments of the invention, the verification manager determines whether the application configuration information indicates that the execution environment is capable of hosting the application by comparing the application configuration information with execution environment configuration information. As discussed above, the application configuration information specifies resource requirements and procedural requirements for hosting the application and the execution environment configuration information specifies resource information and procedural information associated with the execution environment.

If the resource information and procedural information included in the execution environment configuration information specify that the execution environment includes at least the resource requirements and the procedural requirements specified by the application configuration information, then the verification manager may determine that the application configuration information indicates that the execution environment is capable of hosting the application. If the resource information and procedural information included in the execution environment configuration information specify that the execution environment does not include at least the resource requirements or the procedural requirements specified by the application configuration information, then the verification manager may determine that the application configuration information indicates that the execution environment is not capable of hosting the application. The determination as to whether the application configuration information indicates that the execution environment is capable of hosting the application may be made via other and/or additional methods without departing from the invention.

In one or more embodiments of the invention, if it is determined that the application configuration information indicates that the execution environment is capable of hosting the application, then the method may proceed to step 228. In one or more embodiments of the invention, if it is determined that the application configuration information indicates that the execution environment is not capable of hosting the application, then the method may proceed to step 226.

In step 226, a rejection is sent to the application.

In one or more embodiments of the invention, the verification manager sends a message to the application. The message may include a notification that indicates that the execution environment is not capable of hosting the application. The message may include other and/or additional information without departing from the invention. As a result, the application may send a to a verification manager of another execution environment using a copy of the execution environment inventory obtained from the advertisement manager to determine application migration eligibility between the application and another execution environment. A rejection may be sent to the application via other and/or additional methods without departing from the invention.

In one or more embodiments of the invention, the method may end following step 226.

In step 228, potential migration information associated with the execution environment and the application is generated.

In one or more embodiments of the invention, the verification manager generates potential migration information using the execution environment configuration information and the application configuration information. The potential migration information associated with the execution environment and the application may be generated via other and/or additional methods without departing from the invention.

In one or more embodiments of the invention, the potential migration information is one or more data structures that specifies information that may be used to determine whether the application will migrate to the execution environment. The potential migration information may be used by the application to choose an execution environment to which to migrate. The potential migration information may include the performance characteristics associated with the resources of the execution environment specified by the execution environment configuration information. The potential migration information may also include the utilization information of the resources of the execution environment specified by the execution environment configuration information. The potential migration information may include comparisons of resource requirements and resource information specified by the application configuration information and the execution environment configuration information respectively. The comparisons may indicate a computational cost of migrating the application to the execution environment. The potential migration information may include other and/or additional information that may be used to determine whether the application will migrate to the execution environment without departing from the invention.

In step 230, an affirmation and the potential migration information are sent to the application.

In one or more embodiments of the invention, the verification manager sends a message to the application. The message may include a notification that the execution environment is capable of hosting the application. The message may further include the potential migration information associated with the execution environment and the application. The message may include other and/or additional information without departing from the invention. As a result, the application may compare the potential migration information associated with the application and the execution environment with other potential migration information associated with the application and other execution environment to determine which execution migration environment to which to migrate. Furthermore, the application may send a request to a verification manager of another execution environment using a copy of the execution environment inventory obtained from the advertisement manager to determine application migration eligibility between the application and the other execution environment. The affirmation and the potential migration information may be sent to the application via other and/or additional methods without departing from the invention.

In one or more embodiments of the invention, the method may end following step 230.

Example

Figure 3A:
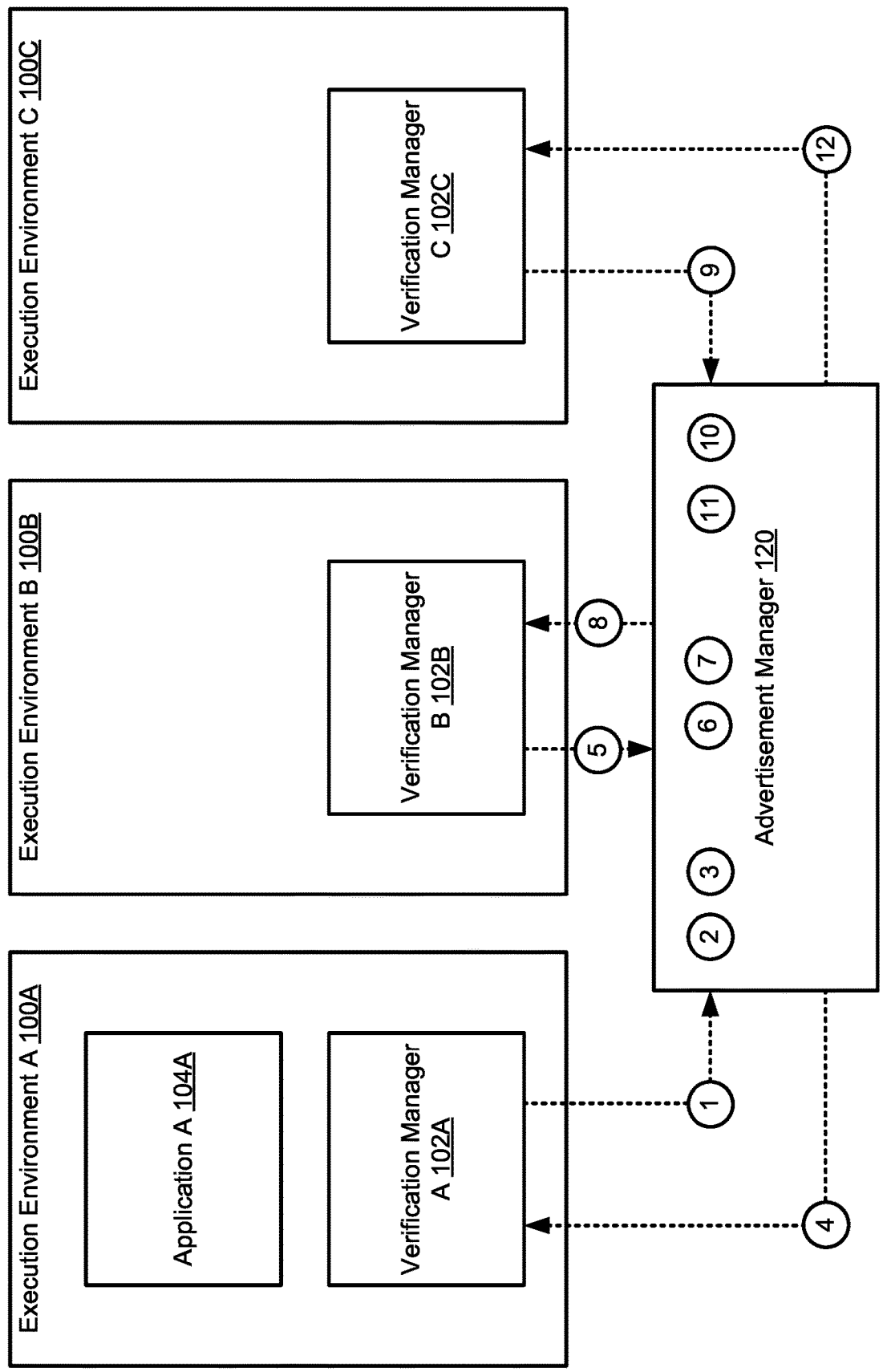

To further clarify embodiments of the invention, a non-limiting example is provided in FIGS. 3A-3B. FIGS. 3A-3B show diagrams of the operation of an example system over time in accordance with one or more embodiments of the invention. FIGS. 3A-3B show a system similar to that illustrated in FIG. 1A. Actions performed by components of the system are illustrated by numbered, circular boxes interconnected, in part, using dashed lines. For the sake of brevity, only a limited number of components of the system of FIGS. 1A-1C are illustrated in FIGS. 3A-3B.

Turning to FIG. 3A, consider a scenario in FIG. 3A in which verification managers of execution environments register the associated execution environments with an advertisement manager (120). The system includes three execution environments, execution environment A (100A), execution environment B (100B), and execution environment C (100C). Execution environment A (100A) includes application A (104A) and verification manager A (102A). Execution environment B (100B) includes verification manager B (102B). Execution environment C (100C) includes verification manager C (102C). The system also includes an advertisement manager (120).

At a first point in time, at step 1, verification manager A (102A) sends a registration request to the advertisement manager (120). The registration request includes an execution environment identifier communication information (i.e., a network address) associated with execution environment A (100A). At step 2, the advertisement manager (120) identifies an advertisement event and makes a determination that the advertisement event is associated with a registration request. As a result, in step 3, the advertisement manager (120) updates an execution environment inventory to include the execution environment identifier and the communication information associated with execution environment A (100A). At step 4, the advertisement manager (120) sends a notification to verification manager A (102A) indicating that execution environment A (100A) is registered with the advertisement manager (120).

After the advertisement manager notifies verification manager A (102A) that execution environment A (100A) is registered, at step 5, verification manager B (102B) sends a registration request to the advertisement manager (120). The registration request includes an execution environment identifier communication information (i.e., a network address) associated with execution environment B (100B). At step 6, the advertisement manager (120) identifies an advertisement event and makes a determination that the advertisement event is associated with a registration request. As a result, in step 7, the advertisement manager (120) updates an execution environment inventory to include the execution environment identifier and the communication information associated with execution environment B (100B). At step 8, the advertisement manager (120) sends a notification to verification manager B (102B) indicating that execution environment B (100B) is registered with the advertisement manager (120).

After the advertisement manager notifies verification manager B (102B) that execution environment B (100B) is registered, at step 9, verification manager C (102CB) sends a registration request to the advertisement manager (120). The registration request includes an execution environment identifier communication information (i.e., a network address) associated with execution environment C (100C). At step 10, the advertisement manager (120) identifies an advertisement event and makes a determination that the advertisement event is associated with a registration request. As a result, in step 11, the advertisement manager (120) updates an execution environment inventory to include the execution environment identifier and the communication information associated with execution environment C (100C). At step 12, the advertisement manager (120) sends a notification to verification manager C (102C) indicating that execution environment C (100C) is registered with the advertisement manager (120).

Turning to FIG. 3B, FIG. 3B depicts the same system as that of FIG. 3A at some point in time after the advertisement manager notifies verification manager C (102C) that execution environment C (100C) is registered. At step 1, application A (104A) sends an application migration eligibility request to the advertisement manager (120). As a result, at step 2, the advertisement manager (120) identifies an advertisement event and determines that the advertisement event is associated with an application migration eligibility request. At step 3, the advertisement manager (120) generates a copy of the execution environment inventory and sends the copy of the execution environment inventory to application A (104A).

At step 4, using the copy of the execution environment inventory, application A (104) sends an application migration eligibility request to verification manager B (102B) of execution environment B (100B). The request includes a copy of application configuration information associated with application A (104A). At step 5, verification manager B (102B) identifies the potential application migration event and determines that the application configuration information associated with application A (104A) indicates that execution environment B (100B) is not capable of hosting application A (104A) by comparing the application configuration information associated with application A (104A) with execution environment configuration information associated with execution environment B (100B). At step 6, verification manager B (102B) sends a message to application A (104A) rejecting the application migration eligibility request.

At step 7, using the copy of the execution environment inventory, application A (104) sends an application migration eligibility request to verification manager C (102C) of execution environment C (100C). The request includes a copy of application configuration information associated with application A (104A). At step 8, verification manager C (102C) identifies the potential application migration event and determines that the application configuration information associated with application A (104A) indicates that execution environment C (100C) is capable of hosting application A (104A) by comparing the application configuration information associated with application A (104A) with execution environment configuration information associated with execution environment C (100C). At step 9, verification manager C (102C) generates potential migration information associated and sends a message to application A (104A) that execution environment C (100C) is capable of hosting application A (104A) and that includes the potential migration information. At step 10, application A (104A) determines to migrate to execution environment C (100C) based on the potential migration information.

End of Example

As illustrated in the example above, execution environments are able to advertise available to host applications to an advertisement manager. The advertisement manager may provide an execution environment inventory that includes available execution environments to which applications may migrate to. Applications may use the execution environment inventory to request verification managers to determine application migration eligibility to execution environments which the applications have no prior knowledge about and may be different types of execution environments.

Figure 4:
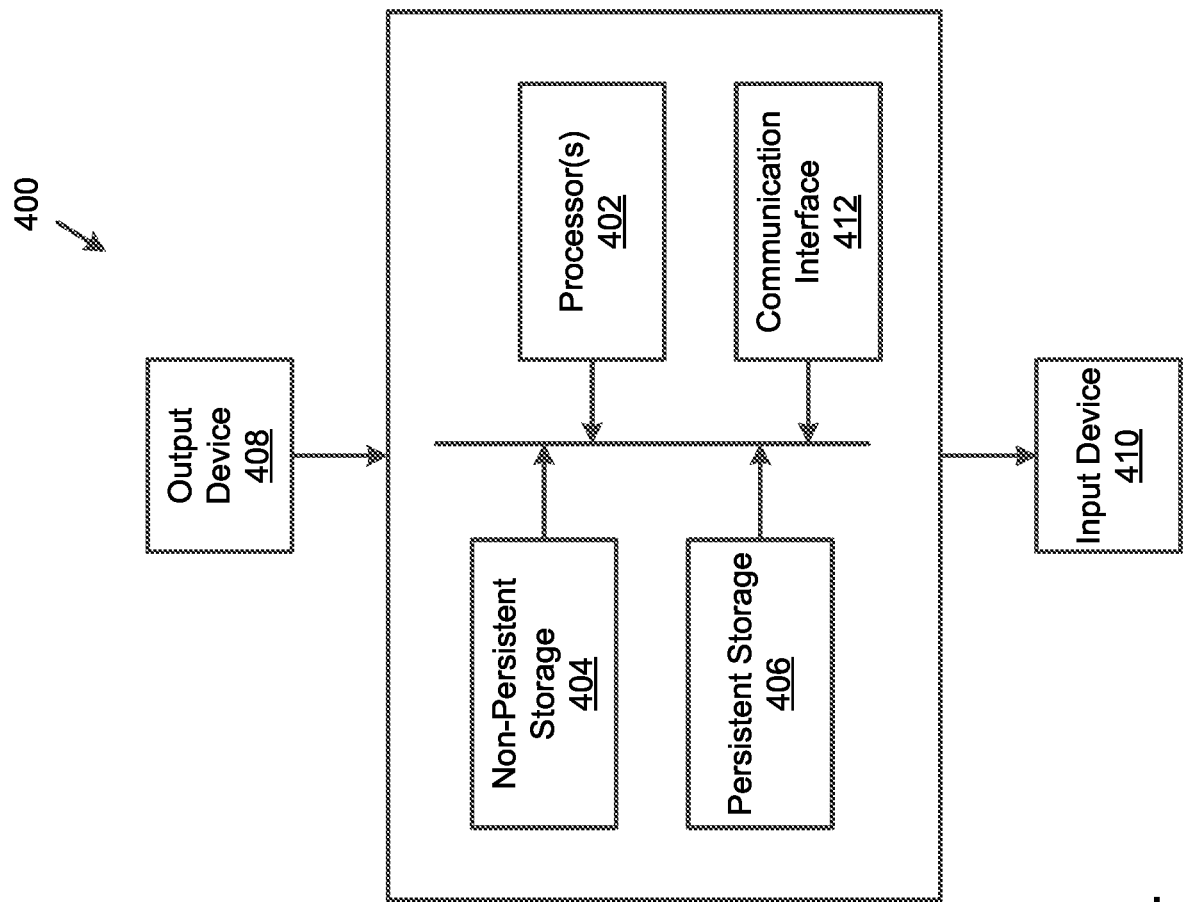
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to a system and method for managing the migration of applications between execution environments. Execution environments may register, through verification managers associated with the execution environments, with an advertisement manager that maintains an execution environment inventory of execution environment that are available for application migration to automatically expand application migration options. Additionally, each execution environment may be associated with a different type of execution environment. Further, the advertisement manager may provide the execution environment inventory to applications that desire to migrate. The applications may use the execution environment information to send application migration eligibility requests to verification managers. The verification manager may determine whether execution environments are capable of hosting the applications and generate potential migration information that may be used by the applications to determine whether to migrate to the associated execution environments. As a result, applications may efficiently determine whether an execution environment is appropriate for migration with no prior knowledge of the execution environment.

Thus, embodiments of the invention may address the problem of inefficient use of computing resources to migrate applications. This problem arises due to the technological nature of the environment in which the applications are executed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing migrations of applications, the method comprising:
   receiving, by a verification manager associated with an execution environment, an application potential migration event associated with an application, wherein the application is executing on a second execution environment;
   prior to receiving the application potential migration event:
      registering, by the verification manager, the execution environment with an advertisement manager;
   in response to identifying the application potential migration event:
      obtaining, by the verification manager, application configuration information associated with the application;
      making a determination, by the verification manager, that the application configuration information indicates that the execution environment is capable of hosting the application;
      in response to the determination:
         generating, by the verification manager, potential migration information associated with the execution environment and the application; and
         sending, by the verification manager, an affirmation and the potential migration information to the application.

2. The method of claim 1, wherein the second execution environment does not comprise the execution environment.

3. The method of claim 2, wherein the execution environment is associated with a first execution environment type and the second execution environment is associated with a second execution environment type.

4. The method of claim 1, wherein registering the execution environment with the advertisement manager comprises updating, by the advertisement manager, an execution environment inventory to include an entry associated with the execution environment.

5. The method of claim 4, further comprising:
   after registering the execution environment with the advertisement manager and prior to receiving the application potential migration event:
   providing, by the advertisement manager, a copy of at least a portion of the execution environment inventory, wherein the at least a portion of the execution environment inventory specifies the execution environment, and wherein the application generates the potential application migration event using the at least a portion of the execution environment inventory.

6. The method of claim 1, wherein the application configuration information specifies requirements for hosting the application.

7. The method of claim 6, wherein making the determination that the application configuration information indicates that the execution environment is capable of hosting the application comprises comparing the application configuration information with execution environment configuration information.

8. A system for managing migrations of applications, the system comprising:
   an execution environment;
   a verification manager of the execution environment, comprising a processor and memory, configured to:
      receive an application potential migration event associated with an application, wherein the application is executing on a second execution environment;
      prior to receiving the application potential migration event:
         register, by the verification manager, the execution environment with an advertisement manager;

in response to identifying the application potential migration event:
  obtain, by the verification manager, application configuration information associated with the application;
  make a determination, by the verification manager, that the application configuration information indicates the execution environment is capable of hosting the application;
  in response to the determination:
    generate, by the verification manager, potential migration information associated with the execution environment and the application; and
    send, by the verification manager, an affirmation and the potential migration information to the application.

9. The system of claim 8, wherein the second execution environment does not comprise the execution environment.

10. The system of claim 9, wherein the execution environment is associated with a first execution environment type and the second execution environment is associated with a second execution environment type.

11. The system of claim 8, wherein registering the execution environment with the advertisement manager comprises updating, by the advertisement manager, an execution environment inventory to include an entry associated with the execution environment.

12. The system of claim 11, further comprising:
after registering the execution environment with the advertisement manager and prior to receiving the application potential migration event:
providing, by the advertisement manager, a copy of at least a portion of the execution environment inventory, wherein the at least a portion of the execution environment inventory specifies the execution environment, and wherein the application generates the potential application migration event using the at least a portion of the execution environment inventory.

13. The system of claim 8, wherein the application configuration information specifies requirements for hosting the application.

14. The system of claim 13, wherein making the determination that the application configuration information indicates that the execution environment is capable of hosting the application comprises comparing the application configuration information with execution environment configuration information.

15. A non-transitory computer readable medium comprising computer readable program code, which when executed by a computer processor enables the computer processor to perform a method for managing migrations of applications, the method comprising:
receiving, by a verification manager associated with an execution environment, an application potential migration event associated with an application, wherein the application is executing on a second execution environment;
prior to receiving the application potential migration event:
  registering, by the verification manager, the execution environment with an advertisement manager;
in response to identifying the application potential migration event:
  obtaining, by the verification manager, application configuration information associated with the application;
  making a determination, by the verification manager, that the application configuration information indicates the execution environment is capable of hosting the application;
  in response to the determination:
    generating, by the verification manager, potential migration information associated with the execution environment and the application; and
    sending, by the verification manager, an affirmation and the potential migration information to the application.

16. The non-transitory computer readable medium of claim 15, wherein the second execution environment does not comprise the execution environment.

17. The non-transitory computer readable medium of claim 16, wherein the execution environment is associated with a first execution environment type and the second execution environment is associated with a second execution environment type.

* * * * *